United States Patent [19]
Yanagishima

[11] 4,017,843
[45] Apr. 12, 1977

[54] VEHICLE DRIVER ALERTNESS APPARATUS MONITORING STEERING WHEEL OSCILLATIONS

[75] Inventor: Takayuki Yanagishima, Yokohama, Japan

[73] Assignee: Nissan Motor Co., Ltd., Yokohama, Japan

[22] Filed: Feb. 5, 1976

[21] Appl. No.: 655,580

[30] Foreign Application Priority Data
Feb. 7, 1975  Japan ............... 50-16476

[52] U.S. Cl. .................. 340/279; 180/99; 340/52 R
[51] Int. Cl.² ............. G08B 21/00; B60Q 5/00
[58] Field of Search ......... 340/279, 52 R, 53; 180/99

[56] References Cited
UNITED STATES PATENTS

| | | | |
|---|---|---|---|
| 3,654,599 | 4/1972 | Sepper | 340/52 R |
| 3,678,494 | 7/1972 | Setser | 340/279 |
| 3,794,969 | 2/1974 | Klopfenstein et al. | 340/279 |
| 3,877,541 | 4/1975 | Takeuchi et al. | 340/279 |

Primary Examiner—Glen R. Swann, III

[57] ABSTRACT

Steering wheel oscillations are detected and a first signal generated for each predetermined number of oscillations. A ramp generator is reset by each first signal and, if its output reaches a preset value, a comparator generates a second signal to indicate excessive time between first signals. An up-down counter is counted up by each first signal and down by each second signal. A comparator compares the contents of the counter with a present number and generates a third signal when the number in the counter falls below the present number. A timer consisting of an integrator and comparator generates a forth signal when the third signal has been present for a predetermined time. The forth signal causes an alarm device to alert the driver.

7 Claims, 10 Drawing Figures $t_1$ $t_2$ $t_3$ $t_4$ $t_5$ $t_6$ $t_7$ $t_8$ $t_9$ $t_{10}$ $t_{11}$

VEHICLE DRIVER ALERTNESS APPARATUS MONITORING STEERING WHEEL OSCILLATIONS

BACKGROUND OF THE INVENTION

The present invention relates to vehicle safety apparatus, and in particular to a safety apparatus in which a first signal indicating the presence of driving activity and a second signal indicating the absence of such activity are generated to measure the alertness of a vehicle driver.

In a prior art vehicle safety apparatus, the number of steering oscillations per unit time are counted to measure the degree of alertness of a vehicle driver and if the number of such oscillations falls below a predetermined value, an alarming device will be activated to alert the drawsy driver. Due to the various roadway conditions including the different number of curves in roadway of countryside or of city areas, the frequency of steering oscillations or of movements of an accelerator pedal increases in the city areas, while it decreases in highway cruising. Therefore, it is desirable to compensate for such roadway characteristics in order to produce a valid alarm signal.

The primary object of the present invention is to compensate for various roadway characteristics such as the number of curves in roadway of different localities to generate a valid alarm signal.

SUMMARY OF THE INVENTION

In accordance with the present invention, the driving activity such as the movements of a vehicle steering wheel or of an accelerator pedal is sensed to generate a corresponding electrical signal. This signal is counted to provide a first signal indicating the presence of such driving activity when the number of the electrical signal exceeds a preset value. A timing circuit is provided to measure the interval between successive first signals to produce a second signal when the interval exceeds a predetermined period of time. The first and second signals are used to drive an updown counter in the up-counting and down-counting modes, respectively, such that the counter increases its stored count in response to the first signal and decreases its count in response to the second signal. Therefore, the difference in the number of signals between the first and second signals is a measure of the total activity during a certain length of time. Otherwise stated, the first signal is used as a record of previous driving activity. If such record diminishes below a preset value, an alarm signal is delivered.

BRIEF DESCRIPTION OF THE DRAWING

These and other objects, features and advantages of the invention will be understood from the following description taken in conjunction with the accompanying drawings, in which.

DESCRIPTION OF THE PREFERRED EMBODIMENT

Figure 1:
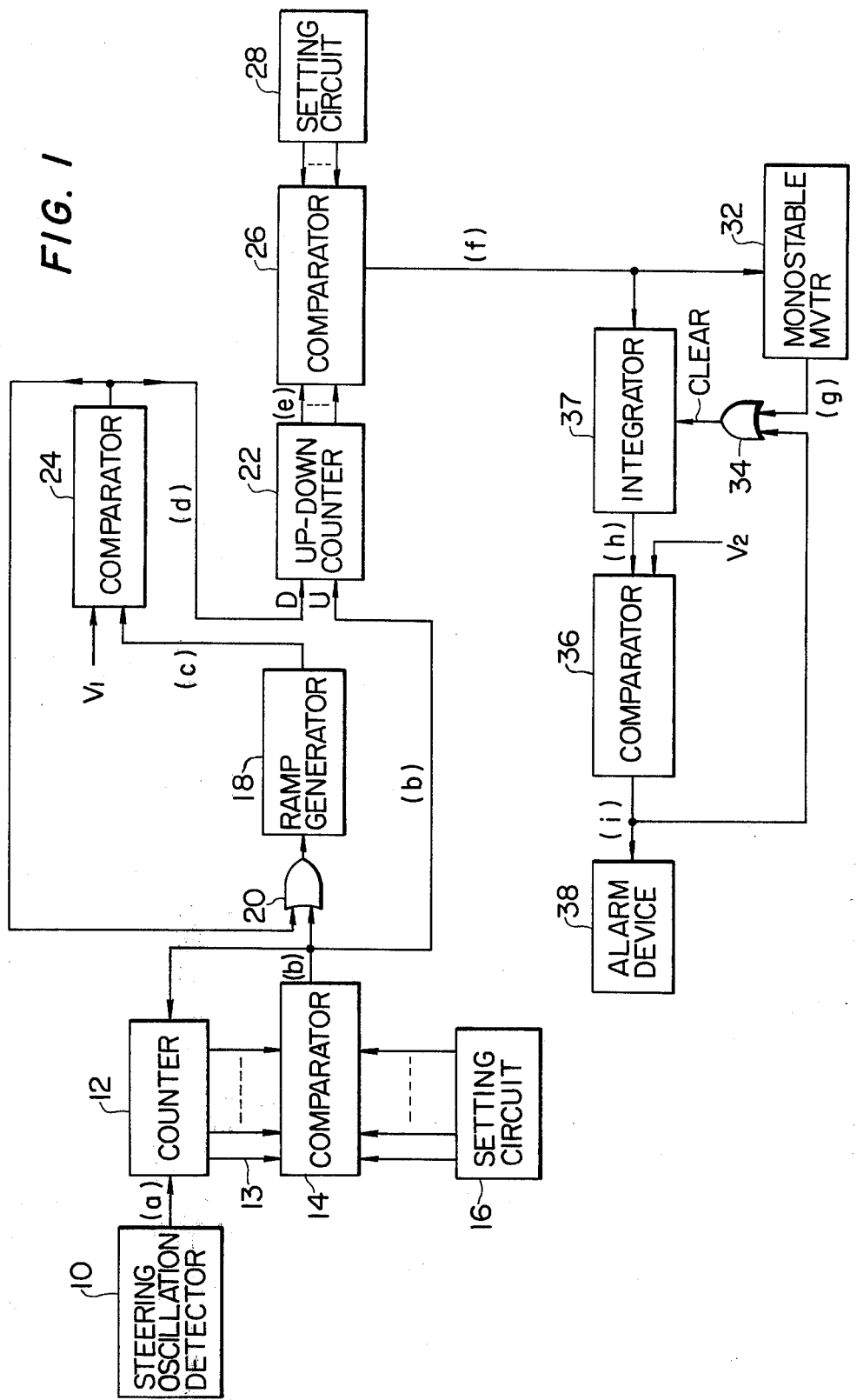
FIG. 1 is a schematic circuit diagram of an embodiment of the present invention.
Figure 2A:
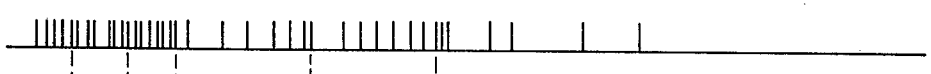
FIGS. 2a–2i are waveform diagrams showing various signal waveforms appearing in the circuit of FIG. 1.
Figure 2B:

In the circuit of FIG. 1, the steering oscillations of a vehicle steering post (not shown) are sensed by a steering oscillation detector 10 which may be of an electromechanical or a photoelectrical conventional arrangement and is designed to produce an electrical signal when the movement of the steering wheel exceeds a predetermined arcuate extent set of a point angularly spaced from the zero position of the steering wheel. A counter 12 receives the electrical signal delivered from the steering osicllation detector 10 successively timed with the steering movements as illustrated in FIG. 2a. The counter 12 tranfers its binary count on output leads 13 in parallel form to a comparator 14 to which is also applied a binary count signal from a setting circuit 16. Comparator 14 provides a digital output as shown in FIG. 2b when the two binary inputs coincide with each other. The signal from the comparator 14 represents that a predetermined number of steering oscillations has been counted irrespective of the time elapsed.

Figure 2C:
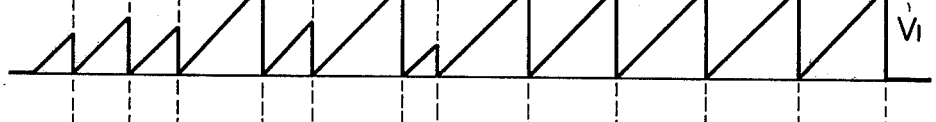
Figure 2D:
Figure 2E:

To the output of the comparator 14 is connected a ramp generator 18 (via OR gate 20), the reset terminal of the counter 12 and the upcounting input of an up-down counter 22. The output from the comparator 14 resets the counter 12 to allow it to receive the subsequent signals from the steering oscillation detector 10, triggers the ramp generator 18 to generate a sawtooth waveform signal as illustrated in FIG. 2c, and permits the up-down counter 22 to function as an up-counter which counts up the signal from the comparator 14 to increase its count as illustrated in FIG. 2e. The ramp generator 18 is triggered upon receipt of an input signal to generate a voltage which increases linearly with time. This linearly increasing voltage is compared with a preset voltage $V_1$ by a voltage comparator 24 which generates an output (FIG. 2d) indicating that a predetermined time has elapsed from the instant a previous signal from the comparator 14 is generated. Therefore, ramp generator 18 and comparator 24 constitute a timing circuit to measure the elapse of time from the instant of generation of each output from the comparator 14 and the occurrence of a signal from the voltage comparator 24 represents that steering movements tend to occur less frequently within a predetermined period of time set by the timing circuit comprised of ramp generator 18 and comparator 24. The output from the voltage comparator 24 is coupled to the input of ramp generator 18 through OR gate 20 to trigger it to generate a subsequent sawtooth waveform, and to the downcounting input of the up-down counter 22. The counter 22 is switched to the downcounting mode to count down the previous count representing the number of occurrences of the output from the comparator 14 from times $t_1$ to $t_3$, so that the binary count in counter 22 is decreased by the step of unity at time $t_4$ in accordance with the signal from the voltage comparator 24, as illustrated in FIG. 2e.

A signal from the comparator 14 occurs at time $t_5$ and sets the up-down counter 22 to count up "1" to increase its total count to 3 and clears the voltage at the output of ramp generator 18 for subsequent timing operation.

Figure 2F:
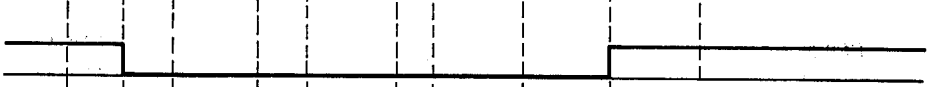
Figure 2G:
Figure 2H:
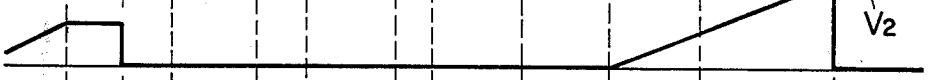
Figure 2I:
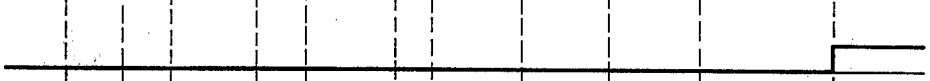

As long as the comparator 14 produces no output, representing the oscillation frequency is below the predetermined level, and as a result of which comparator 26 continues to provide an output to the integrator 37, the voltage at the output of this integrator continues to increase until it reaches the voltage $V_2$ at time $t_{11}$ at which time comparator 36 produces an output as illustrated in FIG. 2i.

An alarming device 38 is activated by the output from the comparator 36 to alert the vehicle driver under the incapacitated conditions.

It is to be appreciated that the up-down counter 22 responds to a first signal that is present as long as steering oscillation frequency is above a predetermined value to increase its count and to a second signal that is present while the steering frequency is below that predetermined value so as to decrease its count. The first signal indicates that the driver is not incapacitated, while the second signal is used to indicate that the driver's steering capability has begun to degrade. The output of the up-down counter 22 is therefore a measure of the driver's steering activity during a period of time since in that period the driver's previous and up-to-the-moment activities are measured.

Since there is a fewer roadway curves in highway than in city areas, the count stored in counter 22 tends to reach the preset alarming level more quickly in highways than in city areas because of the less frequent previous steering activity, so that the driver is more frequently alerted in highway cruise than in city zone drive. This process will repeat until time $t_7$ at which time the total count of counter 22 is 3 as at time $t_5$.

The content of counter 22 is compared with a preset count determined by a setting circuit 28 by means of a comparator 26 which delivers an output only when the count in counter 22 is smaller than the preset value so that it develops a voltage waveform as illustrated in FIG. 2f.

As steering oscillations decrease and as a result the comparator 24 produces signals successively at times $t_8$, $t_9$, $t_{10}$ and so on, the up-down counter 22 counts down correspondingly. At time $t_9$, the comparator 26 produces an output which is connected to the input of an integrator 37 and to a monostable multivibrator 32 which produces a rest pulse at the trailing edge of the input pulse, as illustrated in FIG. 2g. The integrator 30 is arranged to be cleared by the monostable multivibrator 32 through OR gate 34 to accept subsequent signal from the comparator 26. The integrator 37 charges electrically during the period of the signal from the comparator 26 so that its output voltage increases with time as illustrated in FIG. 2h. Since the integrator 30 was reset at time $t_2$ by the pulse of monostable multivibrator 32, the integrator output voltage starts to increase at time $t_9$.

The integrator 37 output is compared with a predetermined voltage $V_2$ by a comparator 36 which produces an output when the input voltage exceeds $V_2$, the output being coupled to the integrator 37 by way of OR gate 34 to clear the integrator output voltage. The integrator 37 and comparator 36 constitute a timing circuit to allow a predetermined time period before activating the alarming device 38 to permit the apparatus of the invention to determine whether the signal from the comparator 26 is valid to warrant the necessary alarming action.

In the foregoing description, the movements of steering wheel are used as a source of information on the driver's activity, it is also possible to use the movements of a vehicle accelerator pedal for the intended purpose. Further, the up-down counter 22 may be replaced with an analog integrator which accumulate charges in response to the first signal from the comparator 14 and discharges the stored energy in response to the second signal from the comparator 24.

Therefore, the embodiment of the present invention comprises means (10, 12, 14, 16) for detecting movements associated with the driving activity of a vehicle driver to produce a first signal in response to a predetermined number of said movements, means (18, 24) for producing a second signal when the interval between successive first signals is greater than a predetermined period, an integration circuit (22) for producing a third signal of which the magnitude increases in the presence of the first signal and decreases in the presence of the second signal, means (26, 28) for producing a fourth signal when the magnitude of the third signal reaches a preset value in 28, and a utilization circuit (37, 32, 34, 36, 38) responsive to the fourth signal to alert the vehicle driver.

Various modifications may be made within the scope of the present invention which is only limited by the appended claims.

What is claimed is:
1. A vehicle safety apparatus comprising:
    means for detecting movements associated with the driving activity of a vehicle driver to produce a first signal in response to a predetermined number of said movements;
    means for producing a second signal when the interval between successive first signals is greater than a predetermined period of time;
    an integration circuit for producing a third signal of which the magnitude increases in response to the first signal and decreases in the presence of the second signal;
    means for producing a fourth signal when the magnitude of the third signal reaches a preset value; and
    a utilization circuit responsive to the fourth signal to alert the vehicle driver.
2. A vehicle safety apparatus as claimed in claim 1, wherein said detecting means comprises means for generating a pulse in response to each movement and means for counting said pulses to produce said first signal when said predetermined number is reached.
3. A vehicle safety apparatus as claimed in claim 1, wherein said movements are derived from the oscillatory movements of a vehicle steering wheel.
4. A vehicle safety apparatus as claimed in claim 1, wherein said means for producing a second signal comprises a ramp generator and a comparator whose input is connected to the output of said generator, said comparator comparing the magnitude of a signal from said generator with a preset value to produce said second signal when the preset value is attained.
5. A vehicle safety apparatus as claimed in claim 1, wherein said integration circuit comprises an up-down counter having up-counting and down-counting modes, said up-down counter being arranged to receive the first signal to permit it to operate in the up-counting mode and to receive the second signal to permit it to operate in the down-counting mode.
6. A vehicle safety apparatus as claimed in claim 1, wherein said means for producing a fourth signal comprises a comparator which compares the magnitude of the third signal with a preset value to produce said fourth signal when the third signal is below the preset value.
7. A vehicle safety apparatus as claimed in claim 1, wherein said utilization circuit comprises a timing circuit responsive to the fourth signal to generate an alarm signal when said fourth signal has persisted for a predetermined time, and means for attracting the attention of said driver in response to said alarm signal.

* * * * *